Oct. 28, 1958  C. A. SIMMONS, SR  2,857,985
AUTOMOBILE LIFTING APPARATUS
Filed Aug. 18, 1955  12 Sheets-Sheet 1

INVENTOR.
CHARLES A. SIMMONS, SR.
BY
Davis, Hoyie & Faithfull
ATTORNEYS

Oct. 28, 1958 C. A. SIMMONS, SR 2,857,985
AUTOMOBILE LIFTING APPARATUS
Filed Aug. 18, 1955 12 Sheets-Sheet 2
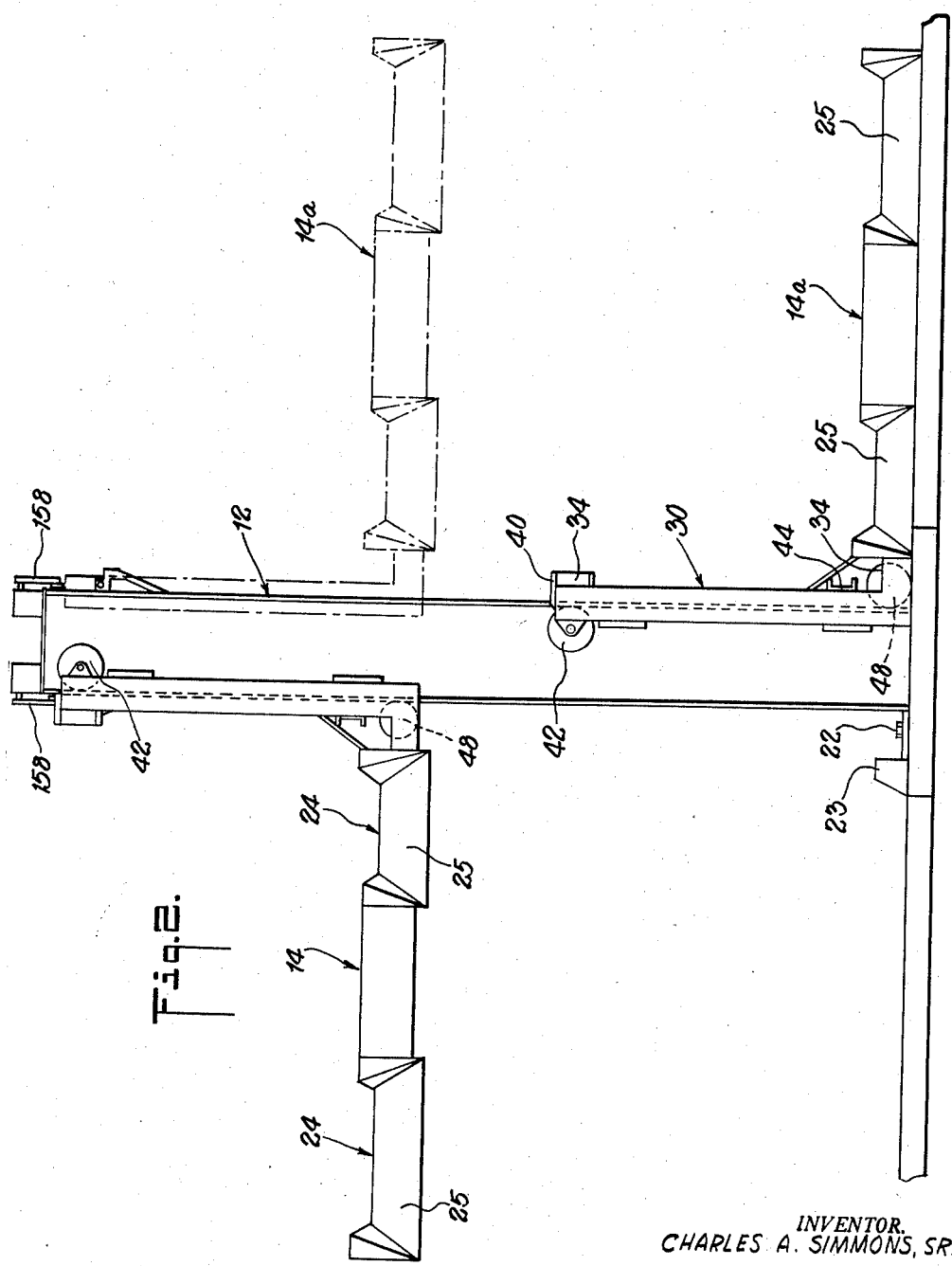
INVENTOR.
CHARLES A. SIMMONS, SR.
BY
*Davis, Hoxie & Faithfull*
ATTORNEYS

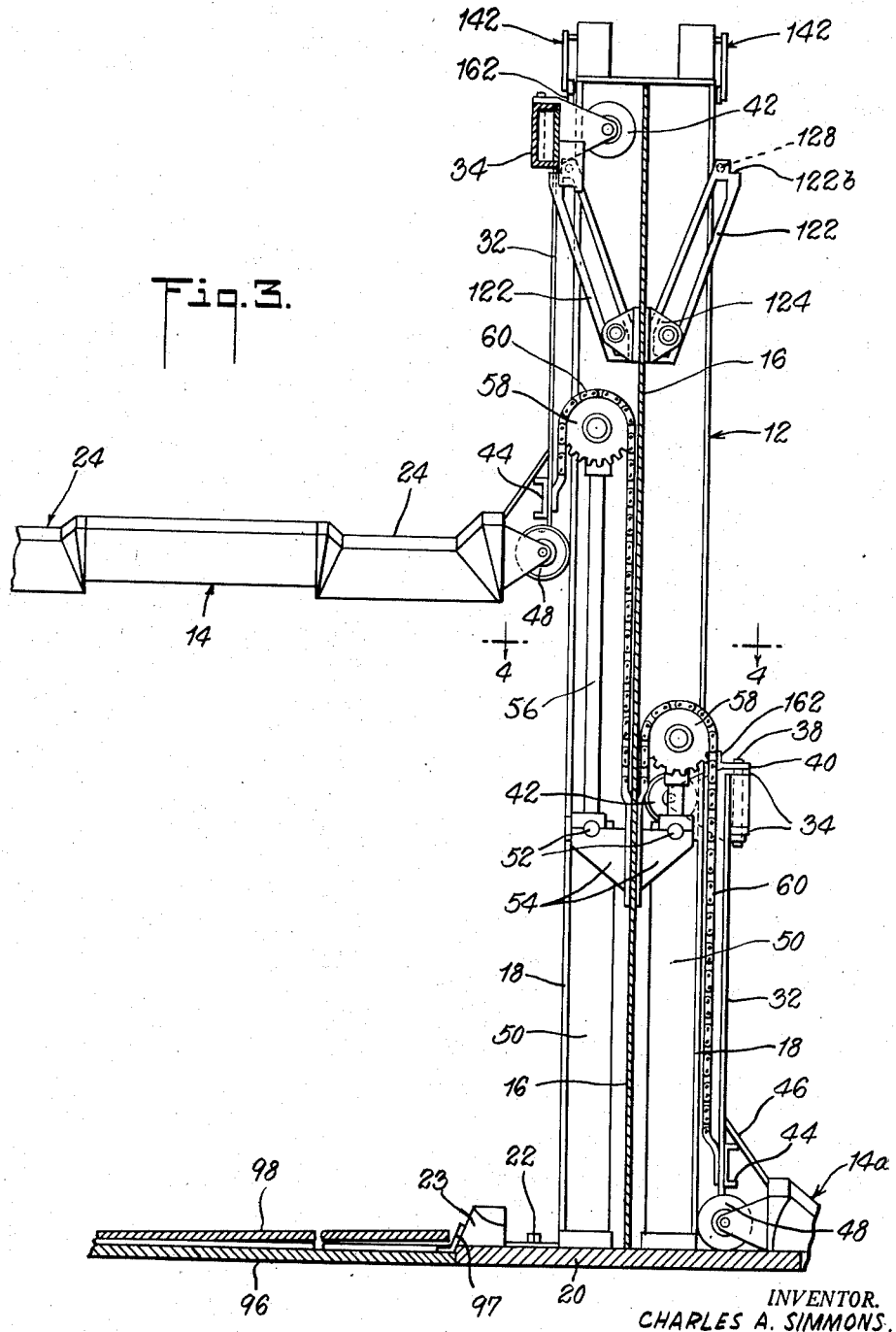

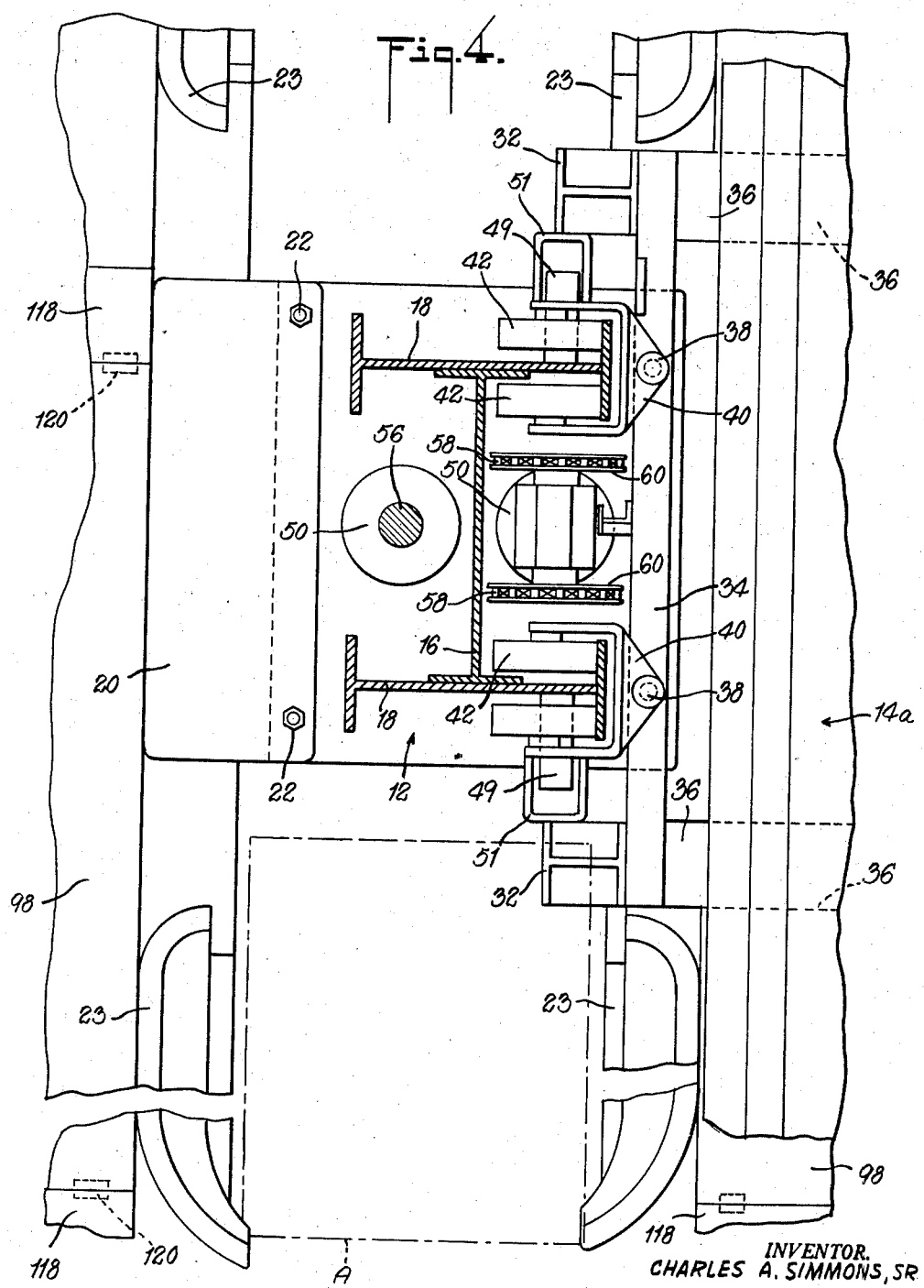

Oct. 28, 1958     C. A. SIMMONS, SR     2,857,985
AUTOMOBILE LIFTING APPARATUS
Filed Aug. 18, 1955                           12 Sheets-Sheet 5
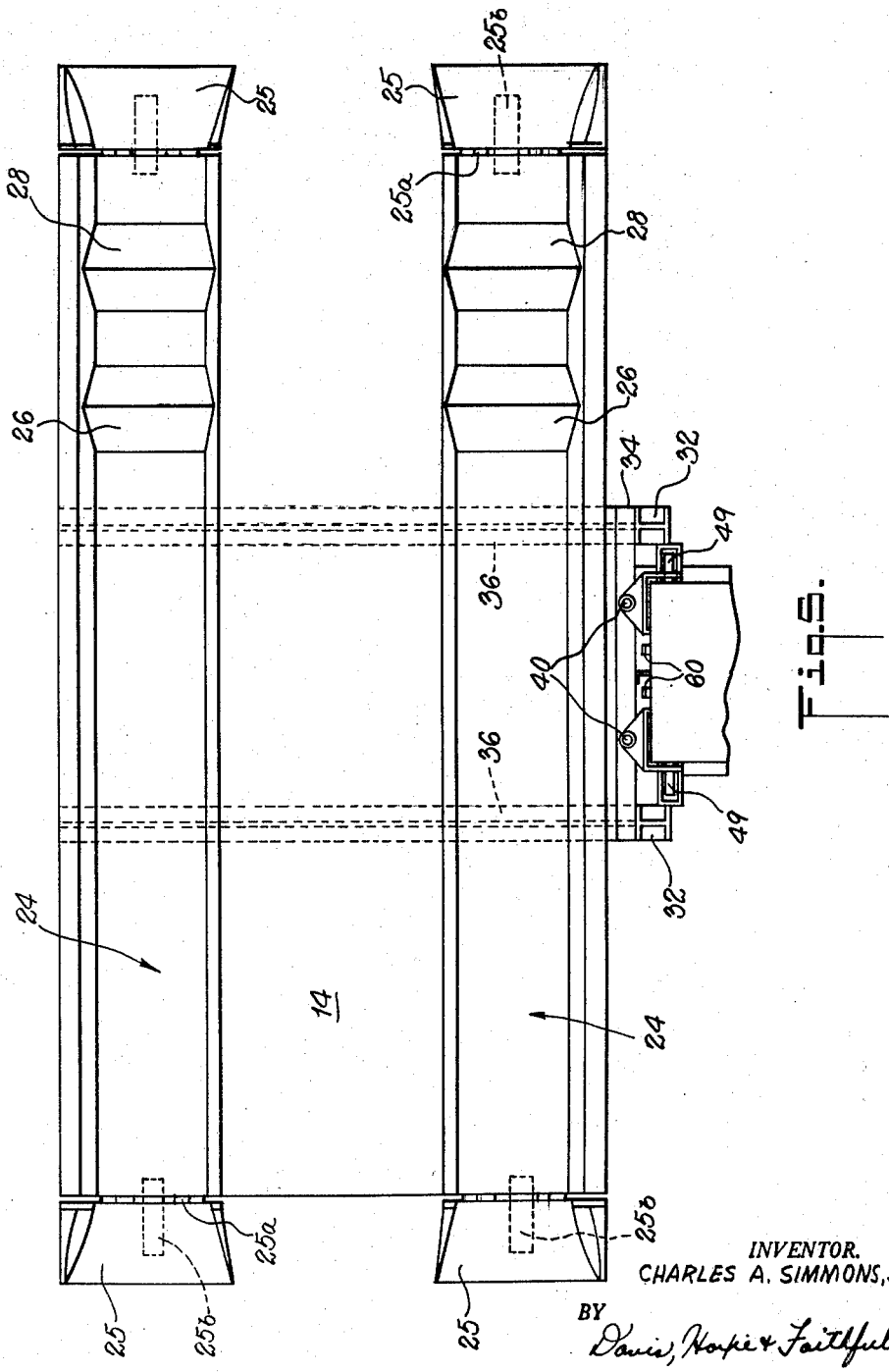
INVENTOR.
CHARLES A. SIMMONS, SR.
BY
*Davis, Hoxie & Faithfull*
ATTORNEYS

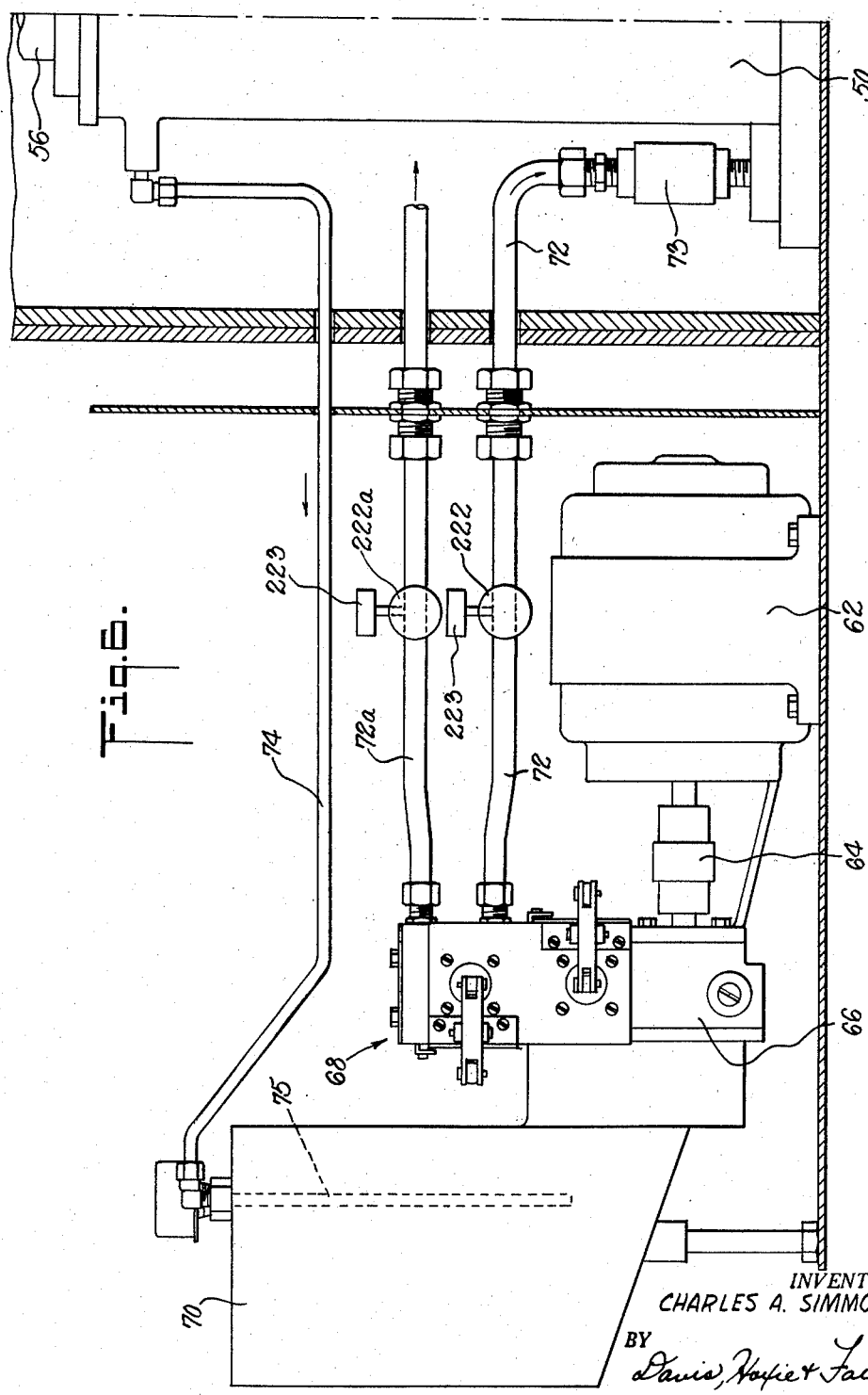

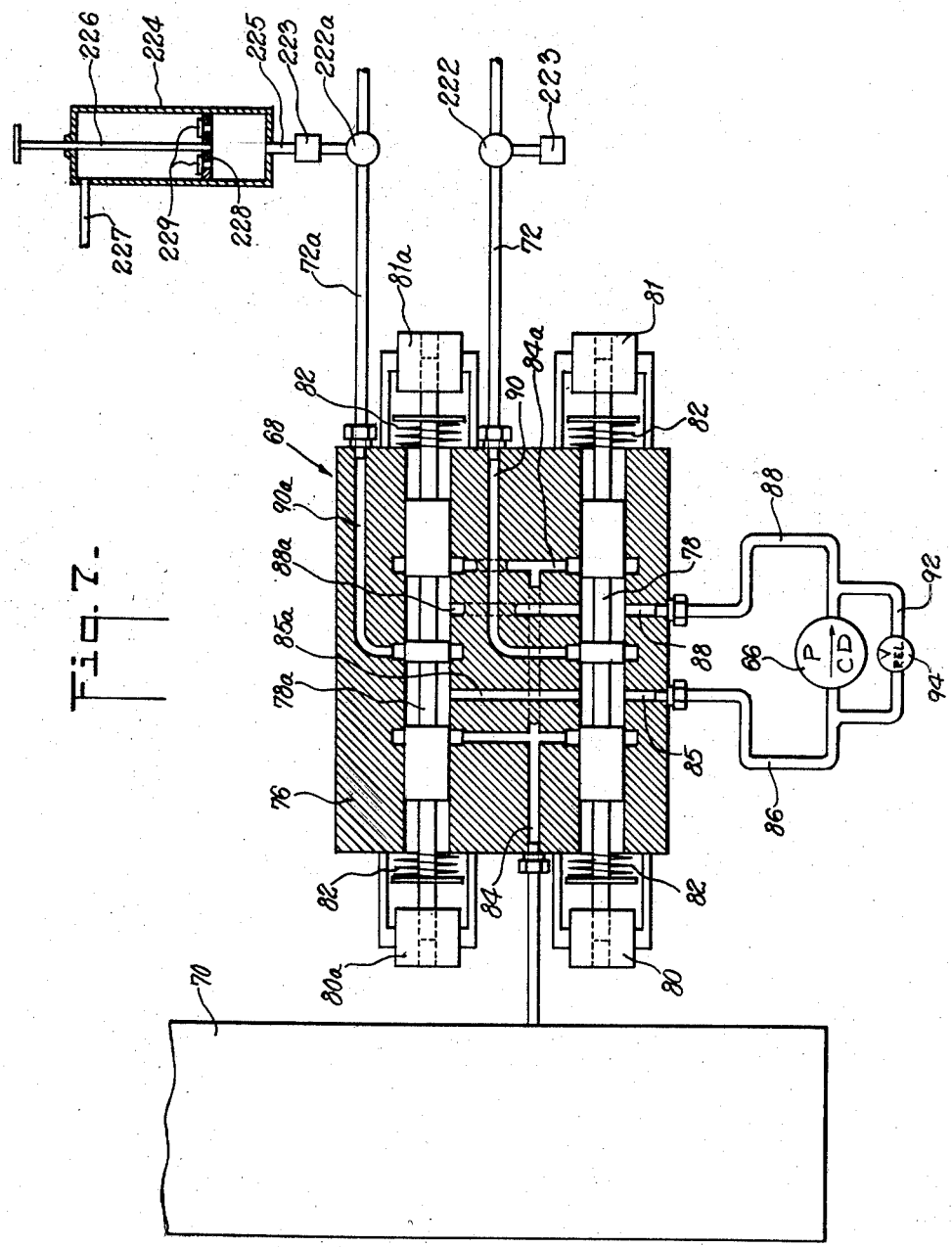

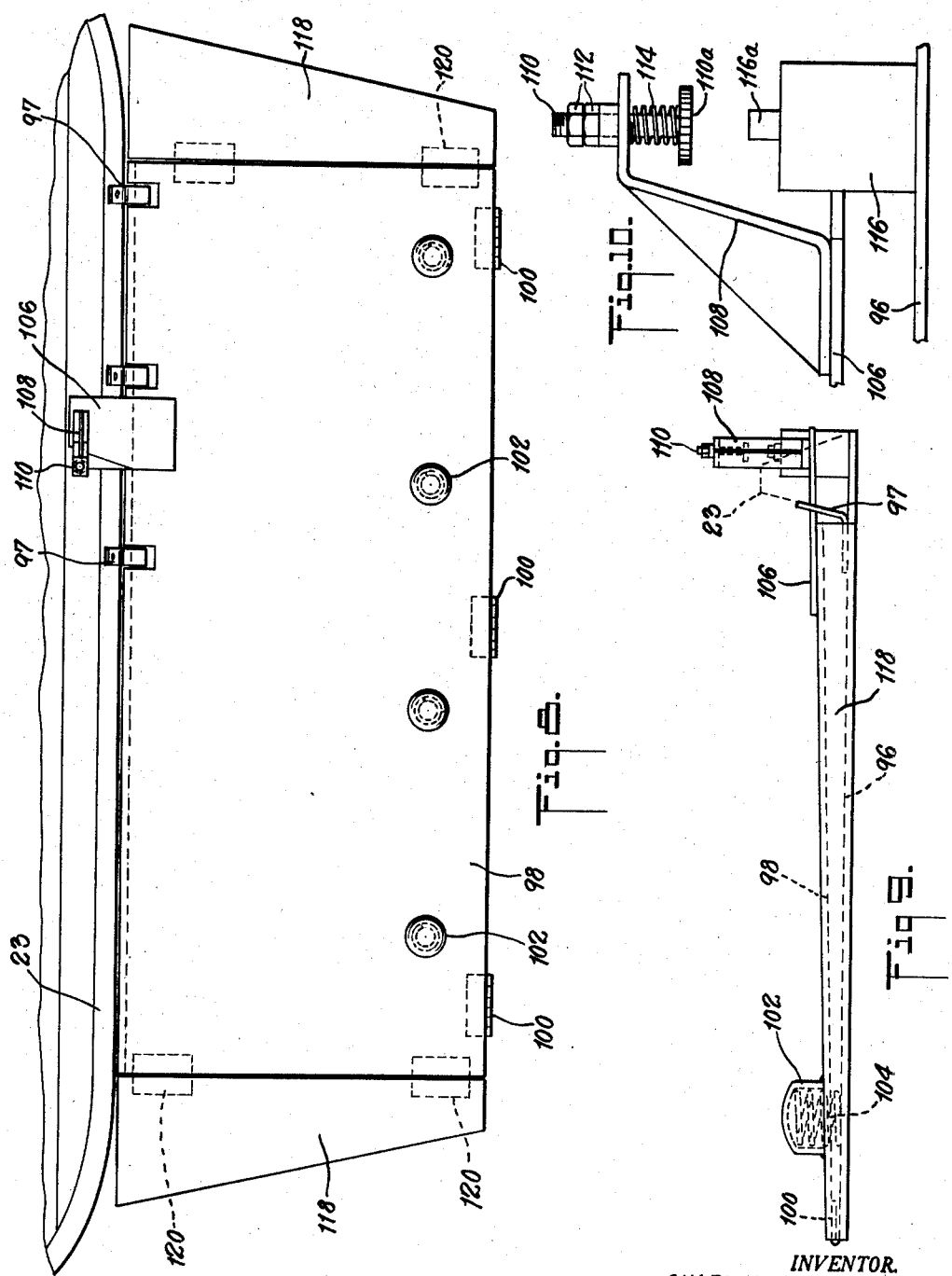

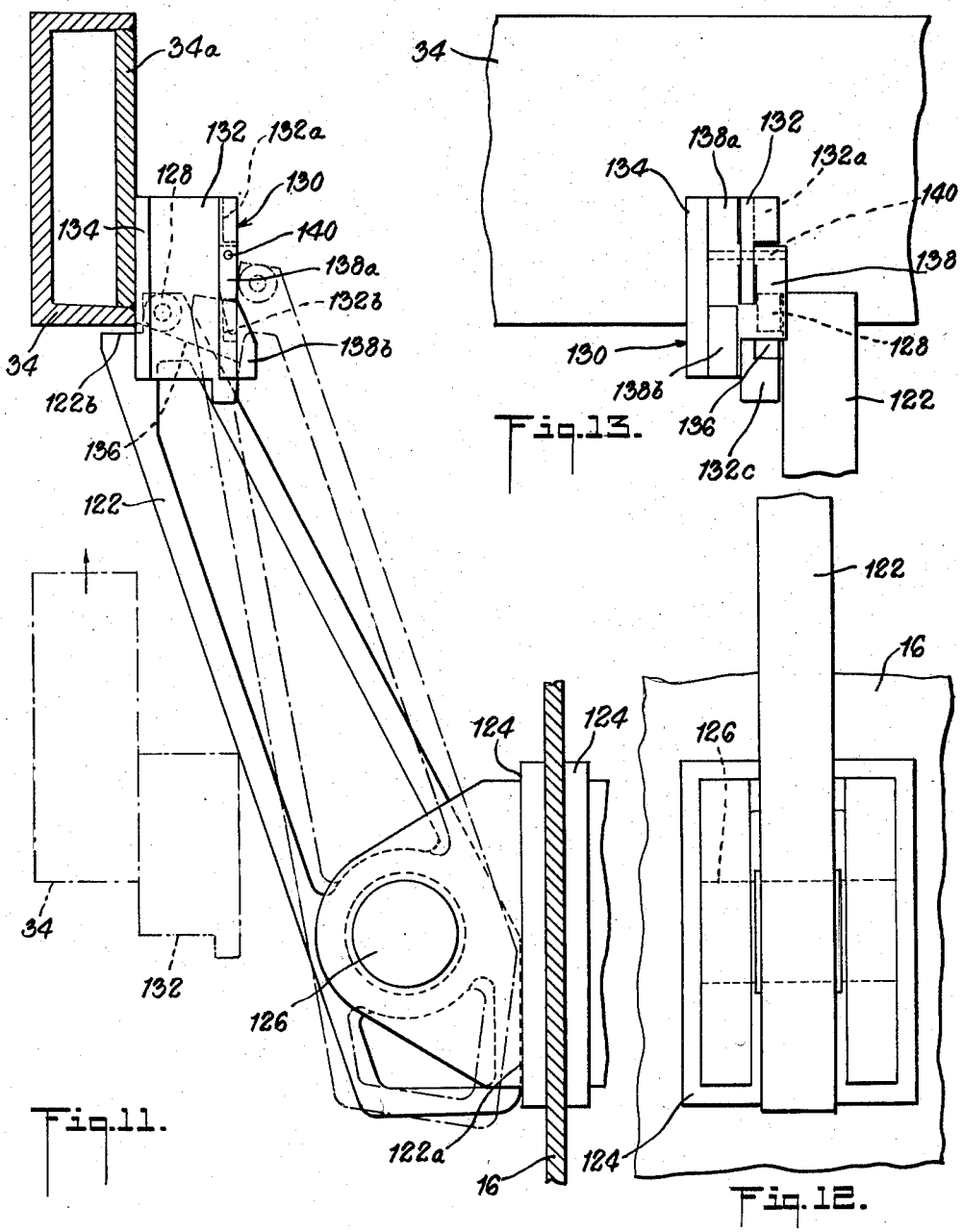

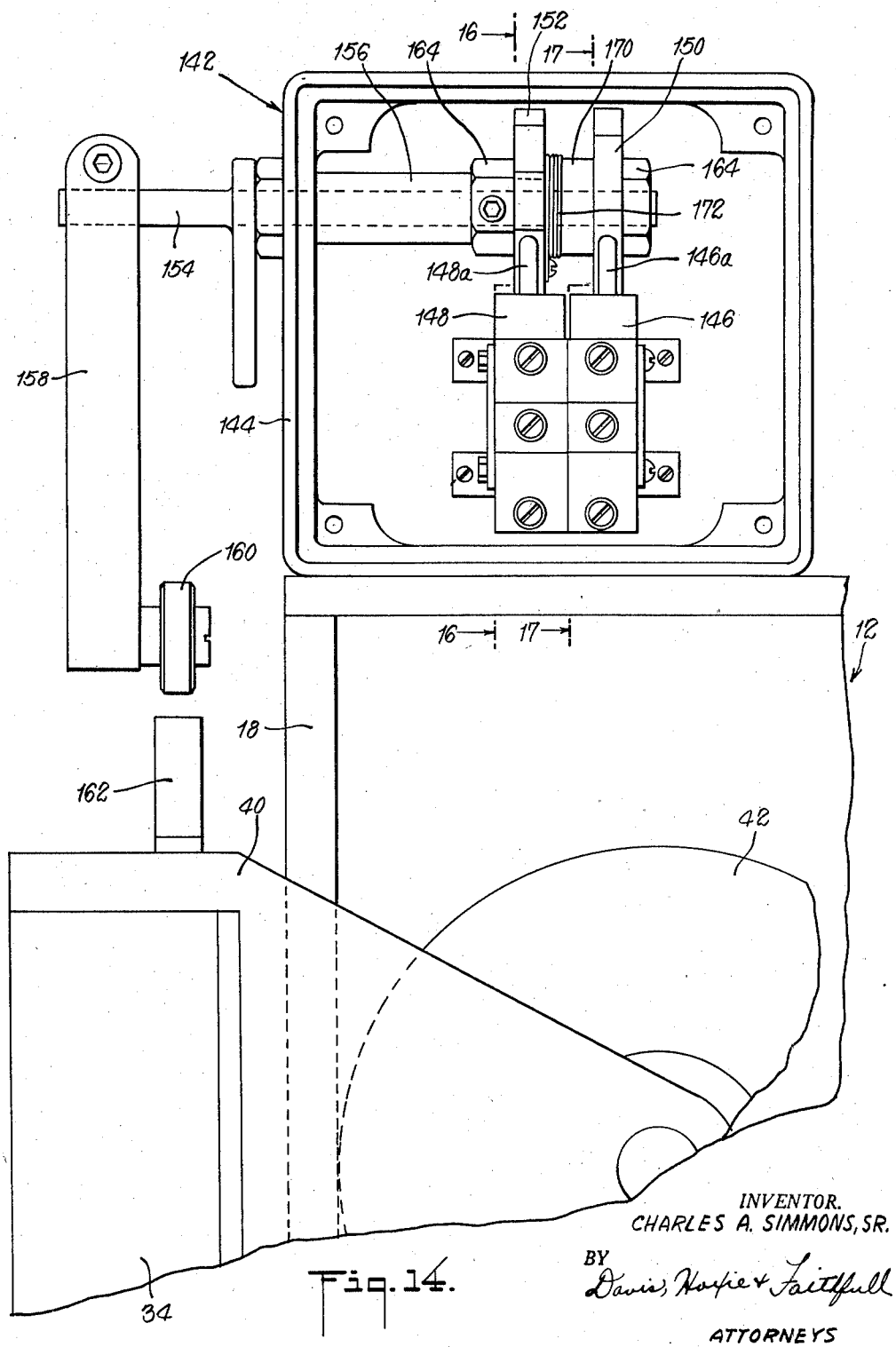

Oct. 28, 1958   C. A. SIMMONS, SR   2,857,985
AUTOMOBILE LIFTING APPARATUS
Filed Aug. 18, 1955   12 Sheets-Sheet 11.
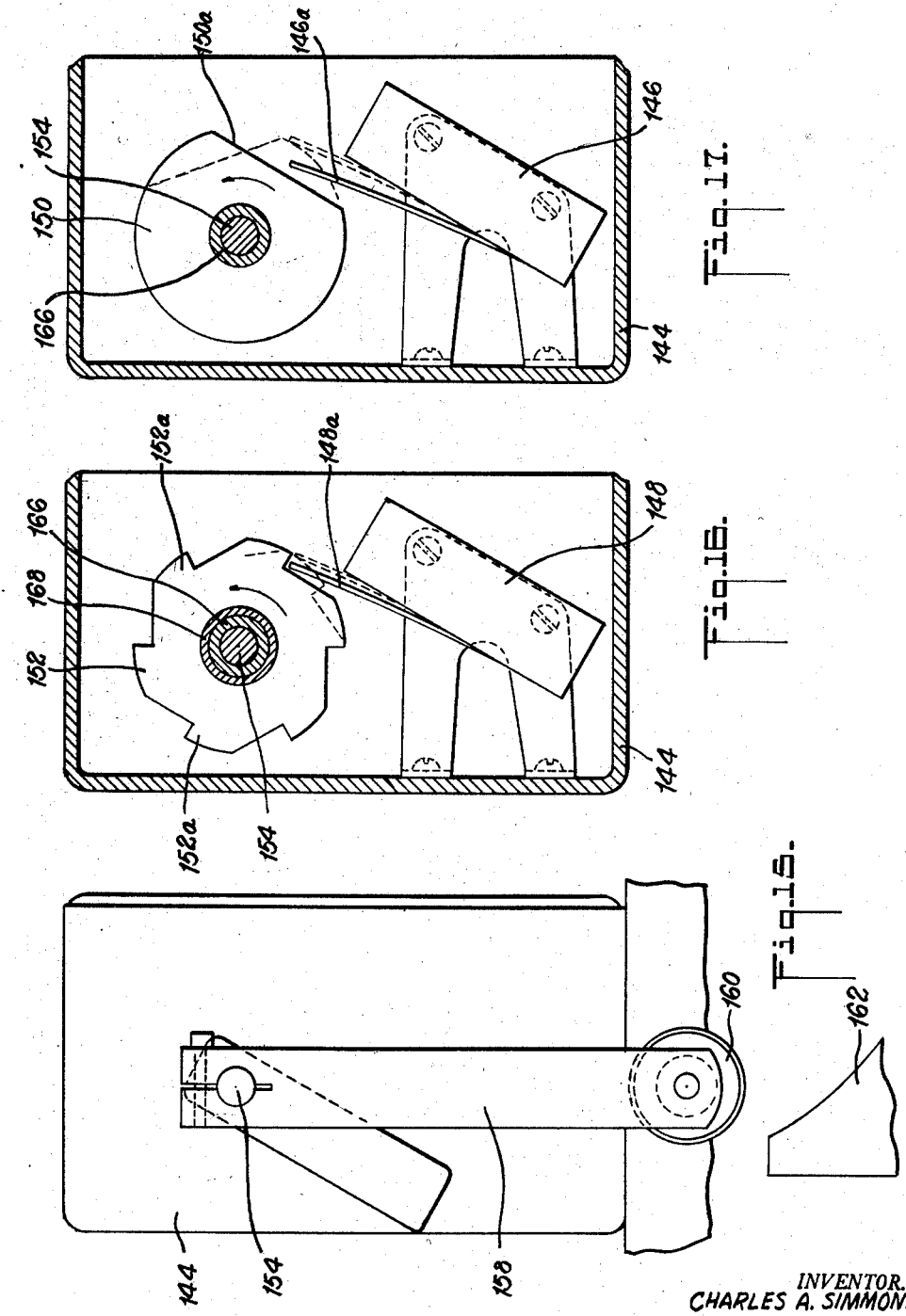
INVENTOR.
CHARLES A. SIMMONS, SR.
BY
ATTORNEYS

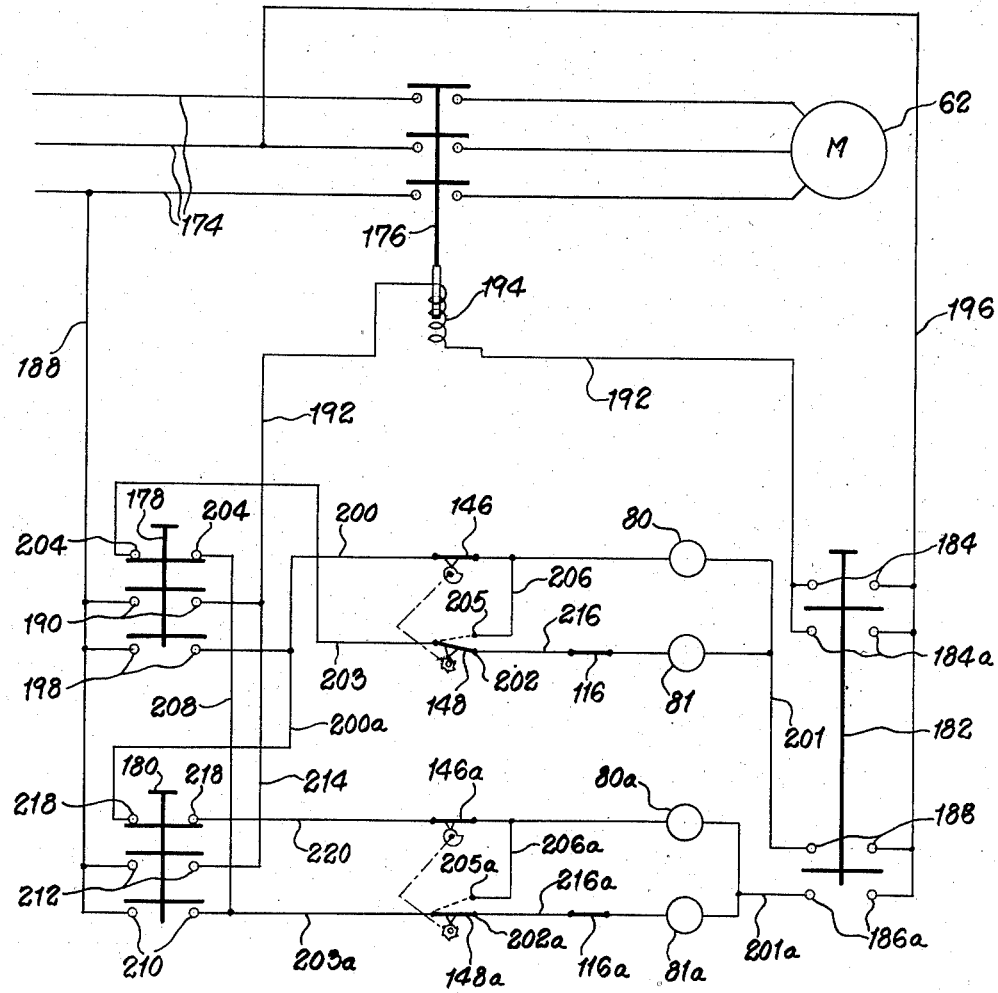

United States Patent Office 2,857,985
Patented Oct. 28, 1958

2,857,985

AUTOMOBILE LIFTING APPARATUS

Charles A. Simmons, Sr., Albany, N. Y., assignor to Simmons Industries, Inc., Menands, N. Y., a corporation of New York Application August 18, 1955, Serial No. 529,205

15 Claims. (Cl. 187—8.41)

This invention relates to automobile lifts of the type which is power-operated to raise or lower an automobile, as for the purpose of increasing the capacity of car parking facilities by making it possible to park one car above another.

The automobile, which in the course of the last forty-five years has transformed this country into a "nation on wheels," is now slowly strangling the usefulness of cities as centers of transportation and commerce. This is evidenced by the recent rapid development and growth of suburban shopping areas and the emigration of many former city dwellers to the suburbs. The ultimate result of these trends, unless reversed, will be the eventual bankrupting of large cities. In the larger cities, the business values are already on the decline, the volume of retail trade transacted in the downtown department stores is diminishing and the related income derived by the city in the form of real estate and sales taxes is dwindling proportionately. At the same time, these cities have been faced with the problem of rising costs and increased consumption of the city-sponsored services and unless these dynamically opposed trends can be reversed it will be impossible for large cities to survive.

If the downtown areas are to regain their dominancy in the retail trade, it is necessary that the parking problem in large cities, which increases daily in direct proportion to the ever-increasing number of automobiles manufactured, be solved. Heretofore the haphazard measures for relieving the congestion of the streets of American cities have been directed towards the construction of isolated parking lots and super-garages which have thus far proved ineffectual, because in the early morning and late afternoon rush hours the thoroughfares leading to these concentrated parking localities become heavily congested and make the overall traffic problem even more intolerable.

In my copending patent application Serial No. 387,850, filed October 23, 1953, of which the present application is a continuation-in-part, I have disclosed an automobile lift comprising a substantially vertical column, car-holding platforms extending outward from the column, and supporting means for the respective platforms movable independently of each other vertically along different sides of the column and each transmitting to the column the turning moment exerted by the corresponding platform. Power-operated means are provided for moving each of the supporting means vertically along the column and independently of the other supporting means so as to raise a car carried by the corresponding platform to an elevated position. Thus, with the use of two platforms supported by a single column, it is possible to park four cars in the area normally required for two cars, and either platform can be raised or lowered without disturbing the two cars parked on and below the other platform.

An object of the present invention is to provide an automobile lifting apparatus in which a car-holding platform can be lowered on the column only when the space below the platform is free, thereby preventing accidental lowering of the platform and possible injury to personnel or damage to a car parked below the platform.

Another object is to provide an automobile lifting apparatus in which each car-holding platform is positively locked in its raised position independently of the power-operated means, the locking device being automatically released under control of a system by which the power-operated means is caused to lower the platform.

A further object is to provide apparatus of this character in which a raised platform can be lowered under manual control in the event of failure of the power-operated means.

According to the invention, accidental lowering of a car-holding platform is prevented by a safety switch responsive to the presence of a load on a plate located directly below the platform, this switch being included in a control system for the power-operated means. Operation of the control system to raise the platform is not influenced by the safety switch; but when the control system is operated to lower the platform, the safety switch is made effective to prevent or interrupt the downward movement. Thus, the platform cannot be lowered as long as there is a load on the underlying plate, because the safety switch then renders the control system incapable of effecting platform movement in the downward direction. This safety switch may also serve as a lower limit switch of the control system, whereby downward movement of the platform by the power-operated means is automatically arrested when the platform reaches a lowermost position against the underlying plate.

To lock the platform positively in its raised position, I provide a releasable latch and a coacting abutment, one located on the supporting column and the other movable with the platform. When the platform reaches its raised position, the latch moves into a locking position against the abutment so as to hold the platform against downward movement independently of the power-operated means. A latch operating device is secured to the abutment and includes a cam engageable with a follower on the latch when the latter is in its locking position against the abutment. Upon further upward movement of the platform from its raised latched position, the latch operating device cams the latch to a non-locking position relative to the abutment; and as the platform descends upon completion of this latch releasing movement, a holding element of the latch operating device holds the latch in its released or non-locking position until it is cleared by the abutment. Accordingly, the platform can be lowered from its raised latched position only by first raising it somewhat above this position to release the latch.

In the preferred form of the apparatus, the control system includes "up" and "down" control members, such as solenoids, which are operable selectively to cause the power-operated means to raise and lower the platform, respectively. These solenoids are under control of manually operable "up" and "down" switches and are also controlled by automatic switching means responsive to upward movement of the platform to its raised latched position for rendering the "up" solenoid operable only by the "down" switch while rendering the "down" solenoid inoperable by either switch. Subsequent actuation of the "down" switch will thus operate the "up" solenoid so as to raise the platform sufficiently to release the latch. Thereupon, the automatic switching means re-connects the "down" switch to the "down" solenoid in lieu of the "up" solenoid, whereby the platform is lowered provided that the "down" switch remains in its actuated position.

The power-operated means preferably comprises an electrically driven pump operable by the control system to deliver hydraulic fluid to or from a cylinder containing a piston connected to the vertically movable supporting means for the platform on the column. To permit lowering of the platform in the event of a power failure, I provide in the hydraulic pipe line between the pump and the cylinder a fitting adapted for connection to a hand pump. When the hand pump is connected to this fitting, hydraulic fluid can be withdrawn from the cylinder at a controlled rate by operation of the hand pump, thereby lowering the platform.

The apparatus in its preferred form comprises at least two platforms mounted for vertical movement independently of each other on the column, each platform overlying a separate plate and safety switch and having a separate hydraulic cylinder and releasable latching means, as previously described. Also, each platform has its own "up" and "down" solenoids and automatic switching means, as previously described; and the control system includes selector means by which the safety switch, the solenoids and the automatic switching means for a selected one of the platforms can be placed under control of the manually operable "up" and "down" switches. Thus, a single power-operated means and a single set of these manual switches will serve all of the platforms on the vertical column, and operation of the selector means permits any one of the platforms to be raised and lowered independently of the other or others and under control of the manual switches.

These and other features of the invention will be better understood by reference to the accompanying drawings, in which Fig. 1 is a side elevational view of a preferred form of the new apparatus;

Fig. 2 is an end elevational view;

Fig. 3 is an end elevational view on a larger scale than Fig. 2, with portions broken away;

Fig. 4 is an enlarged fragmentary sectional view on the line 4—4 in Fig. 3;

Fig. 5 is a plan view of one of the car-holding platforms;

Fig. 6 is an elevational view of the power-operated means, showing the electrically driven hydraulic pump and solenoid-operated valve mechanism by which the pump is connected to the lift cylinders;

Fig. 7 is a schematic view of part of the control system, showing details of the solenoid-operated valve mechanism;

Fig. 8 is a plan view of the plate assembly underlying one of the platforms;

Fig. 9 is an end view, on an enlarged scale, of the plate assembly shown in Fig. 8;

Fig. 10 is an enlarged detail view of part of the plate assembly, showing the safety switch operable by movement of one of the plates;

Fig. 11 is an enlarged detail view of one of the releasable latches and its operating device as seen from one end of the apparatus, the latch being shown in locking position against an abutment of the corresponding platform to hold the latter in its raised position;

Fig. 12 is a view of the lower part of the latch as seen from the left in Fig. 11;

Fig. 13 is a view of the latch operating device and the upper part of the latch, as seen from the right in Fig. 11;

Fig. 14 is an enlarged front elevational view of the automatic switching means for one of the platforms, showing the switching means mounted on top of the column and about to be actuated by the corresponding platform;

Fig. 15 is a side view of the switching means as seen from the left in Fig. 14;

Figure 1:
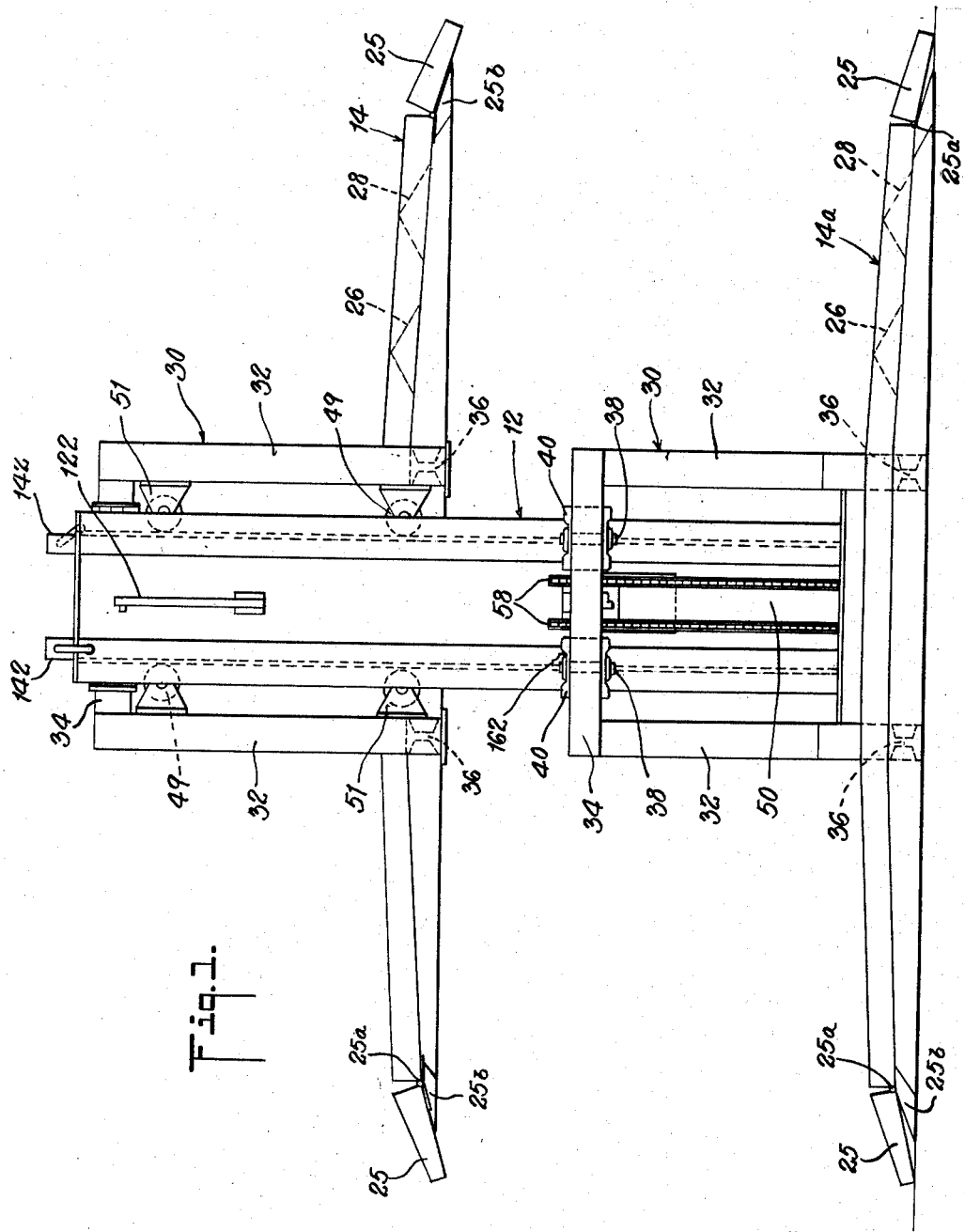

Figs. 16 and 17 are sectional views on the lines 16—16 and 17—17, respectively, in Fig. 14, and Fig. 18 is a wiring diagram of the control system.

Referring particularly to Figs. 1 through 5, the automobile lifting apparatus comprises a vertical column 12 and platforms 14 and 14a mounted for vertical movement on two opposing sides, respectively, of the column. As can best be seen in Fig. 4, the column 12 is preferably fabricated of a centrally disposed vertical I-beam 16 whose flanges are welded respectively to the webs of two vertical I-beams 18. The lower ends of the I-beams 16 and 18 forming the column 12 are welded to a base plate 20 (Fig. 3) which in turn is secured to a supporting foundation (not shown) by bolts 22. A wheel guide 23 extends from the plate 20 on either side of the column 12 to act as a bumper for preventing accidental striking of the column 12 by automobiles which might accidentally be driven too near thereto.

As mentioned above, automobile-supporting platforms 14 and 14a are located on either side of the column 12, although it is to be understood that it is possible to eliminate one of the platforms in the case of limited space or other restriction. As as best shown in Fig. 5, each of the platforms 14—14a is made imperforate so that any oil or grease which might drip from an automobile supported thereupon will be caught and restrained. Extending lengthwise of each platform 14—14a are two depressed channels 24 spaced to accommodate the wheels of an automobile, the sides of the channels being inclined outward. To facilitate the driving of an automobile upon the platform, each platform has end flaps 25 forming extensions of the channels 24 and secured by hinges 25a to the platform. When the platform is in its lowest position, the free ends of these flaps rest upon the underlying base surface; and when the platform is raised, downward swinging of the flaps is limited by stops 25b on the platform. The sides of each flap 25 are inclined and flared outward to serve as wheel guides (Figs. 2 and 5). To center the automobile lengthwise of the platform 14 or 14a and to prevent it from rolling off either end of the platform if the brakes should not be set, each channel 24 is provided with two transverse, spaced protuberances 26 and 28 which are disposed crosswise of the channel to engage the opposite sides of a corresponding rear wheel.

The side of each platform 14—14a adjacent the vertical column 12 is attached to a supporting framework 30 (Fig. 1) comprising spaced vertical members such as the I-beams 32, the upper ends of which are joined by a horizontal channel member 34. The lower end of each I-beam 32 is welded to one end of a horizontal I-beam 36. Extending outward from column 12 directly under the adjacent platform 14 or 14a to give additional stiffening and support for the platform. Pivotally connected to each transverse channel member 34 by pins 38 are two U-shaped brackets 40, the arms of each of which are provided with stub shafts on which rollers 42 are rotatably mounted to bear against the inner faces of the adjacent outer flanges of the column I-beams 18, as can be seen in Fig. 4. The lower end of each supporting frame 30 is further stiffened by a transverse channel 44 (Fig. 3) and a guard plate 46 interposed between the frame and the edge of the adjacent platform 14 or 14a. A lower set of rollers 48 is rotatably carried upon the inner edge of each platform 14—14a so that the rollers bear against the outer faces of the adjacent flanges of the vertical I-beams 18.

It will be evident that with the above described structure, when an automobile is driven upon the platform 14 or 14a, the turning moment resulting from such loading is resisted by the rollers 42 and 48 which at the same time permit a reciprocal vertical movement of the platform with respect to the column 12. Such vertical movement is obtained by power-operated means such as will be described in detail below. Lengthwise positioning of each platform 14 is controlled by rollers 49 rotatably carried in U-shaped brackets 51 which are welded to the vertical I-beam members 32 of each frame 30 so that the rollers 49 bear against the web of the vertical I-beam 18.

Although it is possible to obtain the above-mentioned reciprocal movements of the platforms 14 and 14a by any of several mechanical, electrical or hydraulic means such as will be readily evident to one skilled in the art, I have found that a hydraulically operated cylinder assembly 50 arranged as shown in Fig. 3 provides a smoothly operating, simple power source which requires a minimum of attention and maintenance. An independently operable cylinder assembly 50 is provided for each of the platforms 14 and 14a so that the platforms are selectively operable. Within each cylinder 50 is a closely fitting piston (not shown) which is movable in either direction axially of the enclosing cylinder by the introduction and exhausting of hydraulic fluid in a well known manner in the art. As the cylinder and piston comprising each hydraulic assembly are available commercially, the details thereof will not be described further. The cylinder assemblies 50 are provided with trunnions 52 which are mounted in a pair of yokes 54 fastened to the column 12 to permit a pivotal movement of the assemblies. Alternatively, each cylinder 50 may be mounted by providing a base plate on the cylinder which is bolted directly to the upper surface of the column base plate 20. With this arrangement it is possible to have the loads on the piston and cylinder assembly transmitted directly to the floor plate of the machine.

Extending upward from the piston in each cylinder 50 is a piston rod 56 having a pair of idler pulleys 58 rotatably mounted on its upper end. Preferably, the pulleys 58 are spur gears, each of which has teeth about its periphery. Running over each pulley 58 is a flexible tension member, such as the chain 60, one end of which is permanently tied to the web of the central column I-beam 16. The other end of each of the chains 60 is fastened to the transverse lower channel 44 of the adjacent platform frame 30, so that the platform is moved vertically along the column 12 as the corresponding piston rod 56 is moved by the admission or exhausting of working fluid to or from the bottom of its cylinder assembly 50. Because of the mechanical advantage gained with this arrangement, it will be evident that the vertical distance the platform 14 or 14a moves is twice the travel of its rod 56, so that the required stroke of the piston to obtain a given movement of the platform is reduced by half.

The power-operated means for raising and lowering the platforms 14 and 14a serves to supply hydraulic fluid to and withdraw it from the lower ends of the lift cylinders 50 for the respective platforms. As shown in Fig. 6, the power-operated means comprises an electric motor 62 having its drive shaft connected through a coupling 64 to a hydraulic pump 66, such as a Vickers pump. By means of a solenoid-operated valve mechanism 68 (to be described in greater detail presently), the pump 66 is adapted to have its inlet connected to a hydraulic fluid reservoir 70 and its outlet connected to either one of the pipe lines 72 and 72a leading to the lower ends of the two lift cylinders 50, respectively; and the pump connections are reversible. The valve mechanism 68 thus serves as part of a control system for selectively raising and lowering the platforms 14—14a independently of each other by the hydraulic pressure created by the electrically driven pump 66. As shown in Fig. 6, the hydraulic pipe line 72 leading from the valve mechanism 68 communicates with the lower end of one of the lift cylinders 50 through a fitting 73. It will be understood that the other hydraulic pipe line 72a communicates with the lower end of the other lift cylinder 50 through a similar fitting (not shown). At its upper end portion, each lift cylinder 50 is connected to a return pipe line 74 leading into the reservoir 70 at the top thereof.

It will be apparent that when hydraulic fluid is delivered by the pump from reservoir 70 to the pipe line 72, for example, the piston in the corresponding cylinder 50 is raised so as to elevate the corresponding platform, and at the same time hydraulic fluid is forced from the cylinder space above the piston through the corresponding return line 74 to the reservoir 70. Conversely, when the valve mechanism 68 is set for the pump to deliver hydraulic fluid into reservoir 70 from pipeline 72, the piston in the corresponding lift cylinder 50 moves downward so as to lower the corresponding platform, and at the same time hydraulic fluid is drawn into the upper portion of this cylinder from the reservoir through the corresponding pipe line 74, the latter line having an extension 75 projecting downward into the body of hydraulic fluid in the reservoir. It will be understood that the piston in the other cylinder 50 is operated in a similar manner by hydraulic fluid delivered in one direction or the other through the corresponding pipe line 72a, the upper end of this other cylinder being connected to the reservoir 70 by a return line similar to the line 74.

The details of the solenoid-operated valve mechanism 68 are shown diagrammatically in Fig. 7. As there shown, the valve mechanism comprises a housing 76 containing two spool type valves 78 and 78a for controlling liquid flow through the pipe lines 72—72a, respectively. The valves 78 and 78a are slidable endwise in parallel bores extending through the housing 76 from end to end. The valve 78 is movable to the left or to the right of a centered position by solenoids 80—81, respectively, secured to the housing and into which the reduced ends of the valve 78 project. Similar solenoids 80a and 81a are arranged on the housing to shift the other valve 78a to the left or to the right, respectively, of a centered position. The valves 78 and 78a are normally maintained in their centered positions by compression springs 82.

When the valves 78 and 78a are in their centered positions, as shown in Fig. 7, there is no liquid flow in either direction through either of the pipe lines 72—72a. However, if the solenoid 80, for example, is energized, the resultant shifting of the valve 78 to the left will cause liquid to flow from reservoir 70 through duct 84, the bore containing valve 78, duct 85, the inlet side 86 of pump 66, the outlet side 88 of the pump, the bore containing valve 78, and duct 90 to the pipe line 72 leading to one of the liquid cylinders 50. Accordingly, the corresponding platform will be raised in the manner previously described. Conversely, when solenoid 80 is de-energized and the opposing solenoid 81 is energized, the resultant shifting of valve 78 to the right of its centered position causes liquid to be drawn from pipe line 72 through duct 90, the bore containing valve 78, duct 85, the inlet side 86 of the pump, the pump outlet side 88, the bore containing valve 78, a branch 84a of duct 84, and back to the reservoir 70, whereby the corresponding platform is lowered. Similarly, when solenoid 80a is energized, the resultant shifting of valve 78a to the left causes liquid to flow from reservoir 70 through duct 84, the bore containing valve 78a, duct 85a, the bore containing valve 78, duct 85, the pump inlet side 86, the pump outlet side 88, the bore containing valve 78, duct 88a, the bore containing valve 78a and duct 90a to the pipe line 72a which leads to the lower end of the other cylinder 50. This causes the corresponding platform to be raised. Conversely, when solenoid 80a is deenergized and solenoid 81a is energized, valve 78a is shifted to the right and liquid is drawn from pipe line 72a through duct 90a, the bore containing valve 78a, duct 85a, the bore containing valve 78, the pump inlet side 86, the pump outlet side 88, the bore containing valve 78, the duct 88a, the bore containing valve 78a, ducts 84a and 84, and back to reservoir 70, whereby the corresponding platform is lowered.

As shown in Fig. 7, a bypass line 92 is connected between the inlet and outlet sides of pump 66 and is provided with a pressure relief valve 94. This arrangement enables hydraulic liquid to be recirculated through the line 92 and valve 94 when both of the spool valves 78 and 78a are in their closed or centered positions, so that the pump 66 can be driven continuously regardless of the position of the spool valves.

Referring now to Figs. 8–10, I have there shown a plate assembly for controlling the safety switch previously mentioned. This assembly comprises a stationary bottom plate 96 located beneath one of the platforms 14—14a. The bottom plate 96, which may rest upon the ground, is secured by brackets 97 to the adjacent wheel guide 23 (see also Fig. 3). A top plate 98 overlies the plate 96, and the outer edges of these two plates are hinged together by hinges 100. The upper plate 98 is provided at its outer portion with caps 102, each of which contains a compression spring 104 which bears at its lower end against the bottom plate 96. Thus, the upper plate 98 is normally urged upwardly about hinges 100, this upward movement being limited in any suitable manner, as by the weight of the upper plate 98. A sub-plate 106 is secured to the upper plate 98 at its inner portion adjacent the wheel guide 23 and projects over a recessed portion of the latter. This sub-plate 106 supports a bracket 108 having a raised portion through which a screw 110 extends loosely. Above the bracket 108, the screw 110 has lock nuts 112 for limiting downward movement of the screw relative to the bracket. A spring 114 is compressed between the bracket and the underlying head 110a of the screw. The screw head 110a overlies the operating button 116a of a safety switch 116, such as a micro-switch, this switch being secured to the bottom plate 96 (Fig. 10).

When there is no weight on the upper plate 98, the springs 104 hold the inner portion of this plate in a raised position (Figs. 9 and 10) so that the screw head 110a is spaced above the switch operating button 116a. However, if a car wheel or the operator of the apparatus is on the upper plate 98, the latter is depressed against springs 104 so that its inner end is held down against the stationary lower plate 96. In this depressed position of the upper plate, the screw head 110a engages the switch button 116a so as to operate the safety switch. The spring 114 permits the screw head 110a to raise somewhat when it engages the switch button 116a on downward movement of plate 98, thereby preventing damage to the switch structure through excessive force on the switch button 116a.

The upper plate 98 is provided with end flaps 118 secured to the ends of this plate by hinges 120. The free ends of the hinged flaps 118 rest upon the stationary base surface on which the lower plate 96 rests. The purpose of the hinged flaps 118 is to facilitate passage of a car wheel on to and off the top plate 98, these flaps being adapted to swing on their hinges 120 as the top plate 98 swings up or down incident to movement of a load on to or off this upper plate.

It will be understood that a plate assembly as illustrated in Figs. 8–10 (including the safety switch 116) is provided at each side of the vertical column 12, so that one of these assemblies is located beneath each of the platforms 14—14a. Thus, as shown particularly in Fig. 3, one of these plate assemblies is located beneath the platform 14, and the other plate assembly (not shown) is located beneath the other platform 14a. It will be observed from Fig. 3 that when the platform 14 is lowered from its raised position there shown, this platform will engage the underlying plate 98 and force it downward against the bottom plate 96, thereby operating the corresponding safety switch 116 (Fig. 10), and the safety switch for the other platform 14a is actuated in a similar manner. Preferably, the two plate assemblies, one at each side of the column 12, are located so as to straddle a free area indicated generally at A in Fig. 4, this area lying adjacent the column 12 and representing the area in which the operator will stand when operating the controls (to be described presently) for raising and lowering the platform. With the plate assemblies thus positioned, one or the other of their safety switches 116 will be actuated if the operator should move under the corresponding raised platform from the operating area A. Also, with this positioning of the safety plate assemblies, the upper plate 98 of each assembly will be depressed by one of the wheels of a car parked under the corresponding raised platform 14 or 14a, so as to hold the corresponding safety switch 116 in its actuated position. It will be apparent that each of the plate assemblies may, if desired, be of an area corresponding to that of the overlying platform, so that the corresponding safety switch 116 will be actuated by the presence of a person or object anywhere beneath the raised platform.

The platforms 14—14a are adapted to be locked in their raised positions by corresponding latches 122 mounted on the web of the main girder 16 of the vertical column, as shown in Fig. 3. Each latch 122 is located in vertical alignment with the space between the two sprockets 58 for the corresponding platform (Fig. 1), although the latch will not interfere with these sprockets due to the fact that in the raised position of the platform the sprockets are located somewhat below the corresponding latch, as shown in Fig. 3. The latch 122 and the latch operating device are duplicated for the two platforms 14 and 14a, and therefore will be described in detail in connection with only one of the platforms, with particular reference to Figs. 11–13.

As shown in Figs. 11–13, the latch 122 is pivotally mounted at its lower end portion on a bracket 124 secured to the web of I-beam 16, the bracket carrying a pin or stub shaft 126 on which the latch is pivoted. Outward movement of the upper portion of latch 122 is limited by a stop surface 122a of the latch which is engageable with a flange of the corresponding bracket 124. At its upper end, the latch 122 has a shoulder 122b adapted to underlie the upper horizontal channel member 34 of the supporting frame 30 for the corresponding platform 14. Adjacent the notch forming the shoulder 122b, the latch 122 is provided with a roller or cam follower 128. Through this roller, the latch 122 is adapted to be actuated by a latch operating device 130.

The latch operating device 130 comprises a vertical plate 132 extending inward toward the I-beam 16 from the channel member 34, this plate having a flange 134 welded to a part 34a on the channel member 34. At one side, the plate 132 is formed at the lower portion with a cam surface 136 sloping downward from channel member 34 toward the I-beam 16. A gate 138 is hinged to the plate 132 at its inner edge portion by means of a pivot pin 140. As shown particularly in Fig. 13, the pivot pin 140 extends through the upper portion of gate 138, which underlies a tab 132a on the inner edge portion of plate 132. From the gate 138, the pin 140 extends through the inner edge portion of plate 132 and then through an arm 138a of the gate. Thus, the gate 138 proper and its arm 138a straddle the inner edge portion of plate 132. At its lower portion, the arm 138a has a weight 138b which normally holds the gate in a vertical position, wherein the part connecting the gate proper with its arm 138a is disposed in a notch 132b in the inner edge portion of plate 132.

As shown particularly in Fig. 13, the cam surface 136 of plate 132 is in vertical alignment with the roller 128 of the corresponding latch 122. When the gate 138 is in its normal or vertical position, its lower end lies directly above and at a short distance from the lower or inner end of the cam surface 136.

The operation of the latch 122 and its actuating device 130 is as follows. As the corresponding platform 14 moves upward and approaches its raised position, the channel member 34 of the platform's supporting frame engages the inclined outer portion of latch 122 (Fig. 11) and swings the latch inward about its pivot 126. Accordingly, the outer edge of the shoulder 122b will eventually slide along the inner face of the channel part 34a as the channel member 34 nears its raised position. While the latch 122 is thus held in an inner position, the roller 128 is located between the channel part 34a and the gate 138, so that the cam surface 136 can move upward to the roller, which will be substantially in abutment with the plate 132. When the bottom of channel member 34 clears the latch shoulder 122b, the latch swings outward by gravity to its locking position wherein the latch engages and underlies the abutment formed by the channel member 34. At the same time, the latch roller 128 moves against the outer or upper end of the inclined cam 136. With the latch in this locking position, the corresponding platform 14 is positively locked in its raised position, so that it is no longer necessary to maintain hydraulic pressure in the corresponding cylinder 50 in order to hold the platform in its raised position. As will be described in greater detail presently, the supply of hydraulic fluid to the corresponding cylinder 50 is automatically interrupted when the latch 122 moves to its locking position under the channel member 34 (Fig. 11).

To release the latch 122, it is necessary to raise the corresponding platform 14 and its channel member 34 a slight distance by introducing more hydraulic fluid into the lower part of the corresponding cylinder 50. When the channel 34 is thus raised from the position shown in Fig. 11, the latch roller 128 is forced inward by the downwardly and inwardly sloping cam 136, so that the latch is swung inward toward the I-beam 16 (clockwise in Fig. 11). As a result, the roller 128 engages the lower portion of gate 138 and swings it inward (counter-clockwise in Fig. 11) about its pivot pin 140. Further upward movement of channel member 34 then causes the roller 128 to move under the gate 138 and along the lower inner face 132c of plate 132, so that the roller leaves the cam surface 136. When the roller 128 clears the lower end of gate 138, the latter is returned by its weight 138b to its normal vertical position. At this point, the further upward movement of channel member 34 is arrested and this channel member commences to move downward with the corresponding platform 14, by withdrawing hydraulic fluid from the lower end of the corresponding cylinder 50, as will be described in detail presently. As the channel member 34 moves downward from its uppermost position, the latch roller 128 moves along the inner face of the closed gate 128 and then along the upper tab 132a of plate 132. In other words, the latch 122 is prevented from returning to its locking position by engagement of the closed gate with roller 128, the gate now preventing the roller from moving outward toward the channel member 34. When the roller 128 clears the upper end of tab 132a, the outer edge of shoulder 122b re-engages the inner face of channel part 34a above the latch operating device 130, and continued downward movement of the channel member eventually allows the latch 122 to return to its stopped outer position wherein the shoulder 122b overlies the channel member. The latch 122 and its operating device 130 are now ready for another latching operation when the corresponding platform 14 is raised again.

The interruption of the upward movement of each platform 14—14a when it reaches its latched position, and the subsequent further raising of the platform incident to the unlatching and lowering of the platform, are effected under the control of an automatic switching means 142. As shown in Figs. 1-3, separate switching means 142 are mounted on top of the column 12 in position to be operated by the respective platforms 14 and 14a. As in the case of the latches 122 and their operating devices 130, the automatic switching means 142 for the respective platforms are identical in construction, and therefore only one of such switching means 142 will be described in detail.

Referring to Figs. 14–17, each automatic switching means 142 comprises a casing or housing 144 secured on top of the column 12 and in which two micro-switches 146 and 148 are mounted on suitable brackets. The switch 146 is a normally closed sub-limit switch, and the switch 148 is a transfer switch having two operating positions. The switches 146 and 148 have movable arms 146a and 148a engageable by cams 150 and 152, respectively, for operating these switches. The cam 150 for the switch 146 has a single flat portion 150a (Fig. 17), while the cam 152 for the other switch 148 is in the form of a ratchet wheel having ratchet teeth 152a.

The cams 150 and 152 are mounted on a cam shaft 154 projecting through one side of casing 144, this shaft being rotatable in a bushing 156 secured in the casing. At its outer end, the cam shaft 154 has a depending arm 158, on the lower end of which is a roller or follower 160. This roller is in vertical alignment with a cam 162 secured on the upper channel member 34 of the supporting frame for the corresponding platform 14. The cam 162 is shaped as shown in Fig. 15. Consequently, as the platform 14 nears its raised latch position, the upper portion of cam 162 will engage the roller 160 and swing the arm 158 to the right (Fig. 15), whereby the cam shaft 154 is rotated counter-clockwise as viewed in Figs. 15–17. When the platform 14 reaches its maximum elevation, somewhat above its raised latched position (the point at which the gate 138 will have closed over the latch roller 128), the cam 162 will have rotated shaft 154 through an angle corresponding to the angular spacing between adjacent teeth 152a on the ratchet cam 152. When the platform 14 is subsequently lowered, the cam 162 allows arm 158 to return to its normal vertical position, whereby shaft 154 is rotated back to its normal position indicated in Figs. 16 and 17.

The switch-operating cams 150 and 152 are located between stops 164 secured to the cam shaft 154 (Fig. 14). The cam 150 is secured to shaft 154 by means of a collar 166 which rotates with this shaft. However, the ratchet cam 152 is loosely mounted on the collar 166 by means of a sleeve 168 which is rotatable relative to this collar. A spacer 170 is secured to collar 166 and is located between the two cams 150 and 152. Coiled tightly around the spacer 170 is a spring 172 having one end secured to the ratchet cam 152.

The cam 150 will rock back and forth with the shaft 154, since this cam is secured to the shaft through collar 166. The other cam 162 will rotate in the counter-clockwise direction with shaft 154 (Fig. 16) due to the friction between this cam and the adjacent stop 164 as well as the spacer 170, and also due to the friction between coil spring 172 and the spacer 170. However, the cam 152 is prevented from turning clockwise with shaft 154 (Fig. 16), due to engagement of the end of switch arm 148a with one of the teeth 152a.

Assume that the shaft 154 is rotated counter-clockwise (Figs. 16 and 17) by upward movement of cam 162 with the platform 14. The first action on the switches 146—148 is the shifting of switch 148 to its second position from its normal position, due to engagement of switch arm 148a with the raised part of the adjacent tooth 152a, whereby this switch arm is moved to the broken line position shown in Fig. 16. A slight further counter-clockwise rotation of shaft 154 causes the raised portion of cam 150 to engage switch arm 146a and open the normally closed switch 146. This opening of switch 146 occurs just as the latch 122 falls in position to lock the corresponding platform 114, and it results in interrupting the upward movement of the platform, as will be described presently. Subsequent upward movement of the platform incident to the unlatching operation causes further counter-clockwise rotation of shaft 154 until the end of switch arm 148a slides off the end of the adjacent ratchet tooth 152a, thereby allowing switch 148 to return to its normal position. As will be described presently, this return of switch 148 to its normal position causes the platform 14 to move downward, whereby shaft 154 is turned clockwise back to its normal position so as to allow switch 146 to return to its normally closed position. During this return or clockwise movement of shaft 154, the ratchet cam 152 is held against rotation by engagement of the end of switch arm 148a with the flat edge of tooth 152a now opposing this arm, as previously described.

The control system for the apparatus is shown diagrammatically in Fig. 18. It comprises, in addition to parts already mentioned, an electric power line 174 for operating the electric motor 62, a motor switch 176 by which the motor 62 is connected to or disconnected from the power line 174, a push button "up" switch 178 operable manually to raise either of the platforms 14 and 14a, push button "down" switch 180 operable manually to lower either of the platforms, and a selector means 182 in the form of a three-position switch for placing either of the platforms under control of the "up" and "down" switches 178—180. The selector switch 182 has upper contacts 184 and 186 which are bridged when the platform 14 is to be operated, and is also provided with lower contacts 184a and 186a which are bridged when the other platform 14a is to be operated.

The operation of the apparatus will now be described, with particular reference to Fig. 18. Assume that both platforms 14 and 14a are in their lowermost positions against their respective safety plate assemblies 96—98, whereby the corresponding safety switches 116 are open. When a car is driven upon one of these platforms, for example, the platform 14, this platform is raised in order to make room for parking another car under the raised platform. To raise the platform 14, the selector switch 182 is moved in one direction to bridge the contacts 184 and 186, thereby preparing for energizing of the solenoids 80 and 81 of the valve mechanism illustrated in Fig. 7, these solenoids being adapted to operate the platform 14 as previously described. This movement of selector switch 182 leaves the other set of contacts 184a and 186a open, so that it is impossible to energize the solenoids 80a and 81a for operating the other platform 14a. The "up" switch 178 is now pressed, which establishes a circuit from one wire of power line 174 through conductor 188, switch contacts 190, wire 192, solenoid 194 for operating the motor switch 176, selector switch contacts 184 and conductor 196 to another wire of the power line 174. Accordingly, the solenoid 194 is energized and closes the motor switch 176 so as to start the motor 62. At the same time, another circuit is established from wire 188 through switch contacts 198, wire 200, the sub-limit switch 146 (Figs. 14 and 17), the "up" solenoid 80, wire 201, and contacts 186 to the return wire 196. Thus, the solenoid 80 is energized and operates the valve mechanism of Fig. 7 so as to force hydraulic fluid into the bottom of cylinder 50 corresponding to platform 14, as previously described, causing this platform to be moved upward. This allows the corresponding safety switch 116 to close.

During most of the upward movement of platform 14, the transfer switch 148 is in the position shown in Fig. 18, wherein it engages one of its contacts 202 connected to safety switch 116. However, the switch 148 at this time carries no current, since it is connected through wire 203 to the open contacts 204 of the depressed "up" switch 178. However, when the upward movement of platform 14 carries the cam 162 into engagement with roller 160 (Fig. 15), it first causes actuation of switch arm 148 to its broken line position in Fig. 16, as previously described, whereby switch 148 is shifted from its contact 202 to its second contact 205 which is connected through wire 206 to the conductor 200 between switch 146 and solenoid 80. Further upward movement of cam 162 then causes cam 150 to open the sub-limit switch 146, whereby the "up" solenoid 80 is deenergized and the platform movement ceases. At this point, the latch 122 has just moved under the channel member 34 so as to lock the corresponding platform 14 in its raised position. When upward movement of the platform is thus arrested, the operator releases the "up" switch 178. While this closes the contacts 204 connected to transfer switch 148, the latter can carry no current because contacts 204 are connected through wire 208 to the open contacts 210 of the "down" switch 180. Accordingly, the platform is no longer actuated hydraulically but is locked in its raised position independently of the power operated means by the latch 122.

When it is desired to lower the platform 14, the "down" switch 180 is actuated. This establishes a circuit from the wire 188 through contacts 212, wire 214, wire 192, solenoid 194, and contacts 184 to the return wire 196. As a result, the switch 176 is again closed to start the motor 62. At the same time, a circuit is established from wire 188 through contacts 210, wire 208, contacts 204, wire 203, transfer switch 148 and its contact 205, wire 206, "up" solenoid 80, wire 201, and contacts 186 to the return wire 196. Accordingly, the platform 14 is raised from its latched position so as to cam latch roller 128 under the gate 138 until the latter closes over the roller and thereby prevents return of the latch to its locking position, as previously described (Fig. 11). At this point, the switch arm 148a (Fig. 16) slides off the steep end of the adjacent ratchet tooth 152a so that the transfer switch 148 shifts from its contact 205 to its normal position against contact 202 (Fig. 18). As a result, the "up" solenoid 80 is now deenergized and the "down" solenoid 81 is energized through a circuit extending from wire 188 through contacts 210 and 204, wire 203, transfer switch 148, wire 216, safety switch 116 (if there is no car or other object on the safety plate assembly 96—98 below platform 14), "down" solenoid 81, wire 201, and contacts 186 to the return wire 196. Consequently, the platform 14 will now be lowered by withdrawal of hydraulic fluid from the bottom of the corresponding cylinder 50 through pipe line 72, as previously described. During the initial part of this downward movement of the platform, the sub-limit switch 146 is re-closed by the return rocking movement of cam shaft 154, as previously mentioned.

When the platform 14 reaches its lowermost position against the underlying safety plate assembly 96—98, it causes the movable plate 98 (Figs. 8–10) to open the safety switch 116, whereby the "down" solenoid 81 is deenergized and the platform 14 comes to rest. The operator then releases the "down" switch 180, so that the motor 62 is deenergized.

The operation of the other platform 14a is effected in a similar manner after moving the selector switch 184 so as to bridge the contacts 184a and 186a. To raise the platform 14a, the "down" button 178 is actuated so as to establish a circuit from wire 188 through contacts 190, wire 192, solenoid 194, and contacts 184a to the return wire 196, thereby closing switch 176 and energizing the motor 62. At the same time, another circuit is established from wire 188 through contacts 198, wire 200a, contacts 218 of the "down" switch 180, wire 220, the sub-limit switch 146a for the corresponding platform, "up" solenoid 80a, wire 201a, and contacts 186a to the return wire 196. As the platform 14a nears its raised position, the transfer switch 148a is shifted from contact 202a to contact 205a, and then the sub-limit switch 146a is opened to deenergize the "up" solenoid 80a, which occurs when the corresponding latch 122 moves under the channel member 34 of the supporting frame for the platform 14a. When the upward movement of platform 14a is arrested by this deenergizing of solenoid 80a, the operator releases the "up" switch 178 so as to deenergize the motor 62.

To lower platform 14a, the "down" switch 180 is actuated to energize solenoid 194 through contacts 212 and 184a, so as to re-energize motor 62. This actuation of switch 180 also establishes a circuit from wire 188 through contacts 210, wire 203a, transfer switch 148a, and its contact 205a, wire 206a, "up" solenoid 80a, and contacts 186a to the return wire 196. The resulting further upward movement of platform 14 moves the corresponding latch 122 to its non-locking position, and then allows transfer switch 148a to return to its normal position against contact 202a, in the same manner that the transfer switch 148 is operated. This deenergizes the "up" solenoid 80a and establishes a circuit from wire 188 through contacts 210, wire 203a, transfer switch 148a, wire 216a, safety switch 116a, "down" solenoid 81a, and contacts 186a, to the return wire 196. As a result, the platform 14a will now move downward, its latch 122 being held in the non-locking position by engagement of its roller 128 with the gate 138. The initial downward movement of platform 14a allows the sub-limit switch 146a to return to its normally closed position.

When the platform 14a reaches its lowermost position against the underlying safety plate assembly 96—98, it opens the safety switch 116a and deenergizes "down" solenoid 81a. When the platform movement is thus arrested, the operator releases the "down" switch 180 so as to deenergize motor 62.

It will be apparent from the foregoing that the operation of the movable platforms 14 and 14a is entirely automatic except for actuation of the selector switch 182 and the "up" and "down" switches 178—180. The operation of the latches 122 is entirely mechanical, although their mechanical action is under control of the manual switches 178—180 through raising and lowering of the corresponding platforms. The safety switches 116—116a have no effect upon raising of the platforms, since they are never in circuit with the "up" solenoids 80 and 80a. However, in the event of a load on the movable plate 98 of either of the safety plate assemblies, the resulting open condition of the corresponding safety switch 116 or 116a prevents energizing of the corresponding "down" solenoid 81 or 81a.

In the event of a failure of the power operated means (as through a break-down in the electric supply line 174) the platforms 14 and 14a can be lowered manually so as to allow the use of cars parked thereon. As shown in Figs. 6 and 7, the hydraulic pipe lines 72 and 72a are provided with fittings 222 and 222a, respectively, these fittings having check valves 223. A manually operable pump 224 is adapted to be connected to either of the fittings 222 and 222a, as by screwing the inlet nipple 225 of the pump into the housing of the check valve 223; and when the hand pump is thus connected to the fitting, the check valve 223 is automatically opened. Thus, by operating the pump plunger 226 up and down, liquid can be withdrawn from the pipe line 72 or 72a at a controlled rate and discharged through the pump outlet 227 (Fig. 7), thereby allowing the corresponding platform 14 or 14a to descend. As shown, the piston 228 of hand pump 224 has check valves 229 which open to admit hydraulic fluid into the upper part of the pump chamber when the plunger 226 is depressed; and when the plunger is raised, this fluid is discharged through the pump outlet 227.

It will be observed that the manually operable switches or elements 178—180 are interlocked to prevent simultaneous operation of the "up" and "down" control members or solenoids 80 and 81 (or 80a and 81a).

I claim:

1. In a car-lifting apparatus having a vertical column, and a car-holding platform movable vertically on the column between raised and lowered positions, the improvement comprising a releasable latch for locking the platform in said raised position, a latch operating device responsive to further upward movement of the platform beyond said raised position for releasing the latch, whereby the platform can move downward to its lowered position, power-operated means operatively connected to the platform, "up" and "down" control members operable electrically to effect raising and lowering, respectively, of the platform by the power-operated means, upper and lower limit switches actuatable by the platform, a manually operable "up" switch for electrically operating said "up" member through the upper limit switch, a manually operable "down" switch for electrically operating said "down" member through the lower limit switch, a transfer switch operable in response to movement of the platform to said raised position for placing said "up" member under control of the "down" switch and disconnecting the "down" member from said last switch, and means responsive to said further upward movement of the platform for actuating the transfer switch to restore the "down" member to control by the "down" switch and disconnect the "up" member from said last switch.

2. In a car-lifting apparatus having a vertical column, and a car-holding platform movable vertically on the column between raised and lowered positions, the improvement comprising a releasable latch for locking the platform in said raised position, a latch operating device responsive to further upward movement of the platform beyond said raised position for releasing the latch, whereby the platform can move downward to its lowered position, power-operated means operatively connected to the platform, "up" and "down" control members operable electrically to effect raising and lowering, respectively, of the platform by the power-operated means, a lower limit switch operable by the platform in its lowered position, a manually operable "down" switch for electrically operating said "down" member through the lower limit switch, a manually operable "up" switch for electrically operating said "up" member, and automatic switching means responsive to upward movement of the platform to said raised position for transferring control of said "up" member from the "up" switch to the "down" switch and disconnecting the "down" member from said last switch, said switching means being operable in response to said further upward movement of the platform to restore the "down" member to control by the "down" switch and disconnect the "up" member from said last switch.

3. The improvement according to claim 2, in which said automatic switching means include an upper limit switch operable by movement of the platform to said raised position and through which said "up" member is operated by the "up" switch, and a transfer switch through which only the "up" member is operable by the "down" switch in said raised position of the platform.

4. The improvement according to claim 2, in which said automatic switching means include an upper limit switch operable by movement of the platform to said raised position and through which said "up" member is operated by the "up" switch, and a transfer switch through which only the "up" member is operable by the "down" switch in said raised position of the platform, the transfer switch being operable in response to said further upward movement of the platform to restore only the "down" member to control by the "down" switch through said lower limit switch.

5. The improvement according to claim 2, in which said automatic switching means include a cam shaft adapted to be rocked in opposite directions, respectively, by upward and downward movements of the platform, an upper limit switch through which said "up" member operated by the "up" switch, a cam secured to and rockable with said shaft for actuating the upper limit switch to render said "up" member inoperable by the "up" switch, a transfer switch for placing said "up" and "down" members alternately under control of the "down" switch, and a ratchet cam loosely mounted on the shaft and rockable therewith in only one direction for actuating the transfer switch.

6. In an apparatus of the character described, a platform movable between raised and lowered positions, a latch for locking the platform in its raised position, a latch operating device responsive to further upward movement of the platform from said raised position for releasing the latch to permit movement of the platform to its lowered position, "up" and "down" control members operable respectively to raise and lower the platform, a manually operable "up" element connected to said "up" member for operating the same to elevate the platform to said raised position, a manually operable "down" element, and automatic switching means responsive to elevation of the platform to said raised position for transferring control of said "up" member from said "up" element to said "down" element.

7. In an apparatus of the character described, a platform movable between raised and lowered positions, a latch for locking the platform in its raised position, a latch operating device responsive to further upward movement of the platform from said raised position for releasing the latch to permit movement of the platform to its lowered position, "up" and "down" control members operable respectively to raise and lower the platform, a manually operable "up" element connected to said "up" member for operating the same to elevate the platform to said raised position, a manually operable "down" element connected to said "down" member for operating the same to lower the platform, and automatic switching means responsive to actuation of said "down" element in said raised position of the platform for momentarily operating said "up" member to effect said further upward movement of the platform.

8. A car-lifting apparatus comprising a vertical column, a car-holding platform movable vertically on the column between raised and lowered positions, a plate located beneath the platform and engageable thereby in its lowered position, the plate being depressed by the platform in its lowered position and movable between elevated and depressed positions independently of the platform, power-operated means operatively connected to the platform for raising and lowering the same, a control system operatively connected to said plate and power-operated means and operable by the plate in its depressed position to prevent lowering of the platform by the power-operated means, a releasable latch for locking the platform in its raised position, and a latch-operating device responsive to further upward movement of the platform from said raised position for releasing the latch, the control system including means for effecting said further upward movement and then downward movement of the platform by said power-operated means, to release the latch and lower the platform.

9. A car-lifting apparatus comprising a vertical column, a car-holding platform movable vertically on the column between raised and lowered positions, a plate located beneath the platform and engageable thereby in its lowered position, the plate being depressed by the platform in its lowered position and movable between elevated and depressed positions independently of the platform, power-operated means operatively connected to the platform for raising and lowering the same, a control system operatively connected to said plate and power-operated means and operable by the plate in its depressed position to prevent lowering of the platform by the power-operated means, a releasable latch for locking the platform in its raised position, and a latch-operating device responsive to further upward movement of the platform from said raised position for releasing the latch, the control system including "up" and "down" control members operable electrically to effect raising and lowering, respectively, of the platform by the power-operated means, a switch in circuit with said "down" control member and operable by said plate, and automatic switching means for electrically operating first said "up" member and then said "down" member, to release the latch and lower the platform.

10. In a car-lifting apparatus having a vertical column, and a car-holding platform movable vertically on the column between raised and lowered positions, the improvement comprising a releasable latch for locking the platform in said raised position, a latch operating device responsive to further upward movement of the platform beyond said raised position for releasing the latch, whereby the platform can move downward to its lowered position, power-operated means operatively connected to the platform for effecting said movements thereof, a cam follower on the latch, the latch operating device including a cam engageable with the follower to displace the latch to a non-locking position in said further upward movement of the platform, and a member operable to hold the latch in its non-locking position during subsequent downward movement of the platform through said raised position.

11. In a car-lifting apparatus having a vertical column, and a car-holding platform movable vertically on the column between raised and lowered positions, the improvement comprising a releasable latch for locking the platform in said raised position, a latch operating device responsive to further upward movement of the platform beyond said raised position for releasing the latch, whereby the platform can move downward to its lowered position, power-operated means operatively connected to the platform for effecting said movements thereof, a cam follower on the latch, the latch operating device including a cam engageable with the follower to displace the latch to a non-locking position in said further upward movement of the platform, and a gate operable on the cam follower to hold the latch in its non-locking position during subsequent downward movement of the platform through said raised position.

12. In a car-lifting apparatus having a vertical column, and a car-holding platform movable vertically on the column between raised and lowered positions, the improvement comprising a releasable latch for locking the platform in said raised position, a latch operating device responsive to further upward movement of the platform beyond said raised position for releasing the latch, whereby the platform can move downward to its lowered position, power-operated means operatively connected to the platform for effecting said movements thereof, a cam follower on the latch, the latch operating device including a cam engageable with the follower to displace the latch to a non-locking position in said further upward movement of the platform, and a gate operable on the cam follower to hold it away from the cam during subsequent downward movement of the platform through said raised position.

13. In a car-lifting apparatus having a vertical column, and a car-holding platform movable vertically on the column between raised and lowered positions, the improvements comprising a releasable latch for locking the platform in said raised position, a latch operating device responsive to further upward movement of the platform beyond said raised position for releasing the latch, whereby the platform can move downward to its lowered position, power-operated means operatively connected to the platform, a control system connected to the power-operated means for operating the same to effect said movements of the platform, the control system including "up" and "down" control members operable to electrically effect raising and lowering, respectively, of the platform by the power-operated means, and automatic switching means responsive to said further upward movement of the platform for deenergizing said "up" member and energizing said "down" member.

14. In a car-lifting apparatus having a vertical column, and a car-holding platform movable vertically on the column between raised and lowered positions, the improvements comprising a releasable latch for locking the platform in said raised position, a latch operating device responsive to further upward movement of the platform beyond said raised position for releasing the latch, whereby the platform can move downward to its lowered position, power-operated means operatively connected to the platform, a control system connected to the power-operated means for operating the same to effect said movements of the platform, the control system including "up" and "down" control members operable electrically to effect raising and lowering, respectively, of the platform by the power-operated means, a limit switch connected to said "up" member for deenergizing the same in response to upward movement of the platform to said raised position, and a transfer switch for energizing said "up" member to effect said further upward movement of the platform, the transfer switch being operable in response to said last movement to deenergize said "up" member and energize said "down" member.

15. In a car-lifting apparatus having a vertical column, and a car-holding platform movable vertically on the column between raised and lowered positions, the improvements comprising a releasable latch for locking the platform in said raised position, a latch operating device responsive to further upward movement of the platform beyond said raised position for releasing the latch, whereby the platform can move downward to its lowered position, power-operated means operatively connected to the platform, a control system connected to the power-operated means for operating the same to effect said movements of the platform, the control system including "up" and "down" control members operable electrically to effect raising and lowering, respectively, of the platform by the power-operated means, a limit switch connected to said "up" member for deenergizing the same in response to upward movement of the platform to said raised position, a transfer switch for energizing said "up" member to effect said further upward movement of the platform, the transfer switch being operable in response to said last movement to deenergize said "up" member and energize said "down" member, and a limit switch in circuit with said "down" member and operable by movement of the platform to its lowered position to deenergize said "down" member.

References Cited in the file of this patent

UNITED STATES PATENTS

| | | |
|---|---|---|
| 1,616,841 | Beebe | Feb. 8, 1927 |
| 1,619,360 | Miller | Mar. 1, 1927 |
| 2,201,189 | Makaroff et al. | May 21, 1940 |
| 2,216,058 | Thompson | Sept. 24, 1940 |
| 2,242,891 | Light | May 20, 1941 |
| 2,573,587 | McGraw | Oct. 30, 1951 |
| 2,617,498 | Camerota | Nov. 11, 1952 |
| 2,667,983 | Billings | Feb. 2, 1954 |
| 2,716,466 | Sanders et al. | Aug. 30, 1955 |